United States Patent [19]

Zscheile, Jr.

[11] 4,417,249

[45] Nov. 22, 1983

[54] PHASE WEIGHTED ADAPTIVE PROCESSOR

[75] Inventor: John W. Zscheile, Jr., Murray, Utah

[73] Assignee: Sperry Corporation, New York, N.Y.

[21] Appl. No.: 184,741

[22] Filed: Sep. 8, 1980

[51] Int. Cl.[3] .............................................. H04B 7/00

[52] U.S. Cl. .................................................. 343/379

[58] Field of Search .................. 343/100 LE, 100 CL; 455/278, 296

[56] References Cited

U.S. PATENT DOCUMENTS 4,204,211 5/1980 Cavelos ........................ 343/100 LE

*Primary Examiner*—Theodore M. Blum

*Attorney, Agent, or Firm*—John B. Sowell; Kenneth T. Grace; Marshall M. Truex

[57] ABSTRACT

Undesirable signals which are similar to desirable signals occur in transmitter-receiver systems, phased array antenna systems and null or steering antenna systems and are eliminated by a novel adaptive processor. The undesired signal is electronically cancelled by causing the weak undesired replica signal to track the stronger undesired reference signal. The circuitry structure employs a phase tracking loop which generates a phase tracking error signal. The phase tracking error signal is applied to a voltage controlled oscillator and a fixed delay element in the phase tracking loop path. The phase tracking loop is coupled to the weak signal path to shift the phase of the weak undesired replica signal so that it is in phase with the stronger undesired reference signal and may be electronically cancelled. The system may be employed to eliminate undesired signals and leave weak desired signals uneffected and easily detectable.

13 Claims, 1 Drawing Figure

PHASE WEIGHTED ADAPTIVE PROCESSOR

BACKGROUND OF THE INVENTION

1. Field of the Invention

This invention relates to adaptive processor systems, and more particularly, to a novel phase weighted adaptive processor system for use in radar altimeters, transmitter-receiver systems, null and/or steering systems such as used in phased array antennas and sidelobe cancellation systems.

2. Description of the Prior Art

Prior art adaptive processor systems are known and have been described in text books. Adaptive processors have been employed in sidelobe cancellation systems and for countering anti-radar jamming devices. Such prior art systems have employed parallel signal paths and a pair of amplitude modulators which are phase shifted ninety degrees, one from the other. Such systems are described in U.S. Pat. No. 3,881,177 which describes a system for cancelling an undesired signal.

When the undesired signal is much stronger than the desired signal, it often masks the desired signal to the extent that the desired signal cannot be properly recovered.

Prior art adaptive processors employed numerous elements which are and were susceptible to signal dispersion. Quadrature power splitters, as employed in the prior art are designed for changing the phase of a signal exactly ninety degrees. These devices are not highly accurate, and if several such quadrature power splitters are employed in a single adaptive processor system, the added effect of the error in such devices can produce inaccurate cancellation signals.

It is difficult to obtain a ninety degrees phase shift with phase shifters. Further, in high frequency adaptive processor systems, there are line delays and component delays which can cause phase shifts. Temperature and the age of components and the frequency of the signal applied to components may change the phase shift and/or delay encountered by the signals in a system. Even if the components are properly tuned when a system is manufactured, they are susceptible to drift and changee in use.

Prior art adaptive processors are complex and require expensive components for accurate results. The mode of operation of the aforementioned prior art adaptive processors employ amplitude modulation for the adjustment of the phase of the signals to cancel unwanted weak signals. These prior art systems are expensive and difficult to keep in tune.

It would be extremely desirable to provide an adaptive processor system which is more accurate than prior art adaptive processing systems and is cheaper to build and would eliminate undesired signals.

SUMMARY OF THE INVENTION

It is a principal object of the present invention to provide an improved adaptive processor system.

It is another principal object of the present invention to provide a simplified adaptive processor system having fewer components subject to change which would cause signal dispersion.

It is another object of the present invention to provide a novel phase tracking loop for accurately shifting the phase of one of the undesired signals to track the phase of another undesired signal.

It is another object of the present invention to provide a novel amplitude tracking loop for accurately attenuating the strength of an undesired reference signal.

It is yet another object of the present invention to provide an adaptive processor for use in radar altimeters, transmitter-receiver systems, phased array antenna systems and other electronic systems where undesired signals are present.

According to these and other objects of the present invention, there are provided two signal path inputs to the novel adaptive processor. One path contains an undesired reference signal and the other input path contains an attenuated and delayed replica of the undesired reference signal. Both paths may also contain a desired signal which is recovered. A novel phase tracking loop is coupled to the second path containing the attenuated and delayed replica of the undesired reference signal and is adapted to shift the phase of the replica signal to coincide with the reference signal to permit electronic cancellation of the undesired signal.

BRIEF DESCRIPTION OF THE DRAWINGS

FIG. 1 is a preferred embodiment example of the present invention adaptive processor shown connected to two omni directional antennas of the type employed in a phased array antenna system. Other types of systems such as transmitter-receiver systems, radar altimeters, etc. present the same problem in which two undesired signals are present in the same system. One of the undesired signals in a first signal path is stronger than the undesired signal in the second signal path. The adaptive processor 10 is employed to null out the undesired signals and to leave any desired signal unaffected.

Figure 1:
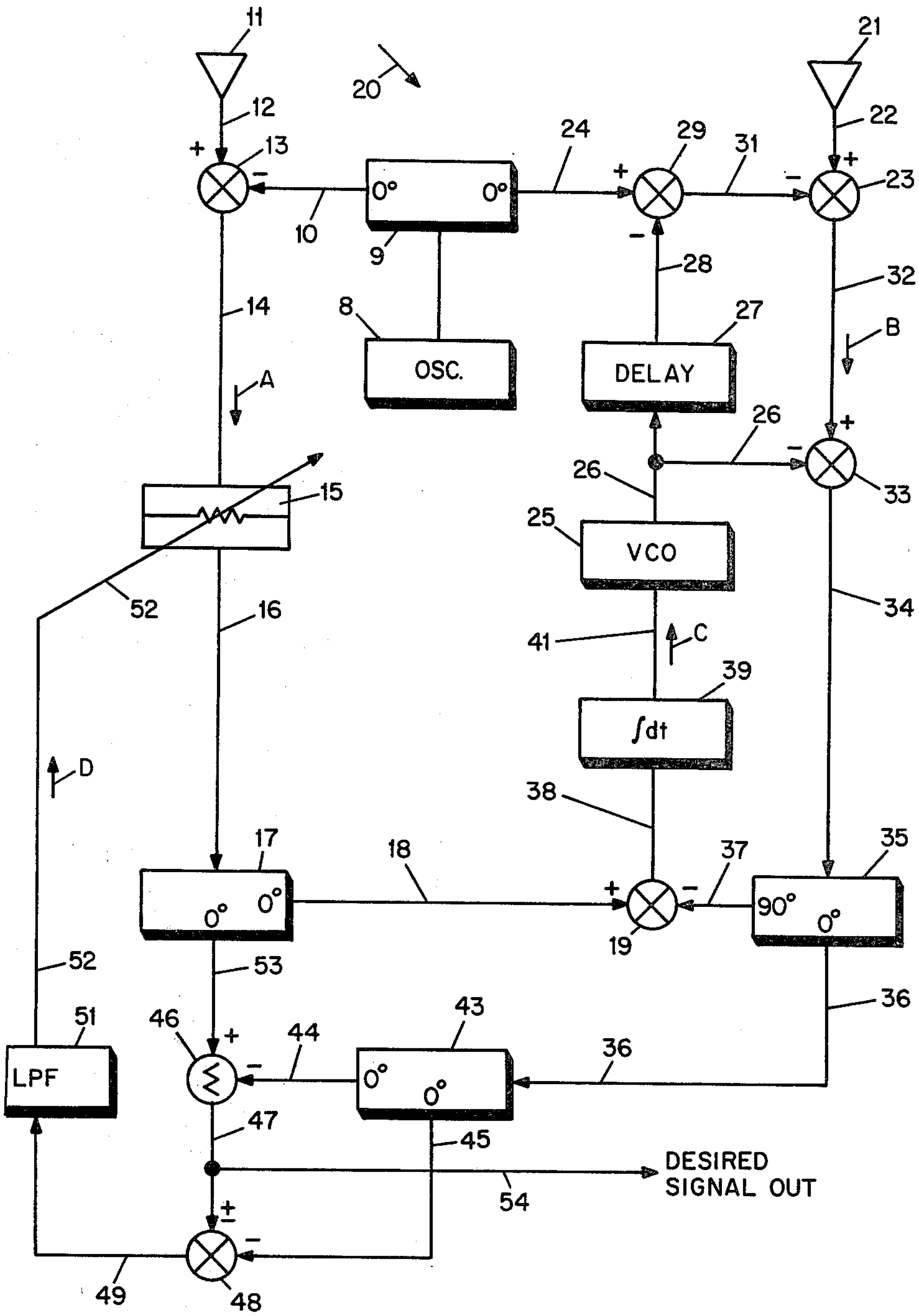
FIG. 1 is a block diagram of a preferred embodiment of the invention.

Omni directional antenna 11 is connected to the first signal path A at line 12 of the adaptive processsor. Arrow 20 indicates the direction of the incoming signal which arrives at antenna 11 before arriving at antenna 21. The signal on line 12, which may be processed, is applied to the positive side of mixer 13. Local oscillator 8 is coupled to power phase splitter 9 and the local oscillator signal on line 10 is applied to the negative side of mixer 13.

It will be understood that the positive and negative inputs to the mixer are conventional representations and that the mixers produce sum and difference frequency components at the output. The desired components are permitted to pass as signals and the undesired components are eliminated.

The carrier frequency signal on line 12 is transposed to an intermediate frequency on line 14. The intermediate frequency signal on line 14 is passed through an adjustable amplitude attenuator 15 and appears on line 16 with or without a phase change as an attenuated undesired reference signal. The reference signal on line 16 is applied to power splitter 17 and appears on line 18 at mixer 19 as an attenuated inphase undesired reference signal.

Arrow 20, indicating the direction of the incoming undesired reference signal, arrives at omni directional antenna 21 after arriving at antenna 11 and may be described as an attenuated and delayed replica of the undesired reference signal. The replica signal on line 22 from antenna 21 may be processed before being applied to the positive side of mixer 23 in the second signal path B.

The negative input to mixer 23 contains a complex signal which is derived from the local oscillator 8 signal on line 24 and the voltage controlled oscillator (VCO) 25 signal on line 26. If the output of oscillator 25 is described as a signal on line 26 equal to cosine $\omega_{VCO}t$ then this signal after passing through fixed delay 27 becomes cosine $[\omega_{VCO}(t+\tau)]$ where $\tau$ is the fixed time delay which causes a phase shift of the VCO signal.

The output of fixed delay 27 on line 28 is applied to the negative input of mixer 29, which also receives a signal from local oscillator 8 via line 24 at its positive input. The output of mixer 29 on line 31 is applied to the negative input of mixer 23, thus, the local oscillator frequency is first added at mixer 29 and subsequently subtracted or mixed down at mixer 23 to reduce the carrier frequency signal on line 22. The output of VCO 25 after passing through fixed delay 27 comprises two major components one of which is the original VCO output signal (cosine $\omega_{VCO}t$). This component is subtracted at mixer 29 and the resulting signal or line 31 is smaller by the VCO component when subtracted in mixer 23 from the carrier frequency on line 22, thus, the intermediate frequency signal (I.F.) on line 32 is higher by the VCO output signal component.

The VCO component signal on line 26 is subtracted from the signal on line 32 in mixer 33, thus subtracting out the VCO component which was effectively added to the intermediate frequency signal on line 32. The signal on line 32 is best described as a phase shifted version of the signal on line 22. The signal on line 22 has been described as an attenuated and delay replica of the reference signal on line 12. The fact that the carrier frequence signals on lines 12 and 22 have been reduced to I.F. frequencies by local oscillator 8 cooperating with mixers 13 and 23 does not change the fact that the signal on line 22 is phase shifted by the tracking loop comprising VCO 25 and delay 27. There are environments where the incoming frequency signals on lines 12 and 22 would not require that they be reduced in frequency and the tracking loop will operate properly with the removal of oscillator 8 and associated circuitry.

When we ignore the step down to I.F., the reference signal at mixer 19 on line 18, which has not been phase shifed, may be described as equal to cosine $[\omega_c t-\omega_c\Delta]$ where "$\omega$" is the carrier frequency with respect to time "t", $\Delta$ denotes the time delay between arrival of the signals at antennas 11 and 21 and $\omega_c\Delta$ is a phase difference between lines 12 and 22.

When we ignore the step down to I.F., the phase shifted replica signal on line 34 may be described as being equal to cosine $[\omega_c t+\omega_{VCO}(t+\tau)-\omega_{VCO}t]$ where $\omega_{VCO}\tau$ represents a phase shift. Cosine $[\omega_c t+\omega_{VCO}(t+\tau)-\omega_{VCO}t]$ reduces to cosine $[\omega_c t+\omega_{VCO}\tau]$. It will be noted that the signals on lines 18 and 34 are the same frequency and have different phase shift components; however, $\omega_{VCO}\tau$ is a variable which can be made equal to $\omega_c\Delta$ by the phase tracking and feedback path C.

The signal on line 34 is applied to quadrature power splitter 35 to provide the same signal on line 36 and a signal on line 37 which is phase shifted plus ninety degrees. The cosine $(\omega\tau+90°)$ is equal to $-$sine $\omega\tau$ and the sine of a small angle is equal to the angle itself. When the signals are mixed in mixer 19, the frequency components are subtracted, and being the same (ie $\omega_c t$), are cancelled. The phase components of the signals on lines 18 and 37 are subtracted leaving $-$sine $\theta$, where $\theta$ represents $\omega_c\Delta-\omega_{VCO}\tau$ and is indicative of the error signal as an output on line 38. The integration of $-$sine $\theta$ on line 38 by smoothing function element 39 over the interval of time integration (dt) provides a smoothed D.C. analog error signal output on line 41. The error signal on line 41 will drive the VCO faster or slower to produce a phase shift component $\omega_{VCO}\tau$ which is equal to $\omega_c\Delta$. When the two phase shift components are equal, the phase tracking loop shown as path C is causing the replica signal path shown as path B to shift its phase and lock on to the phase of the reference signal path shown as path A.

The operation of the phase tracking and feedback path C causes the signal in the second path B (replica signal path) to track and follow the phase of the signal in the first path A (reference signal path). The signal on path B at line 32 will be phase shifted to coincide in phase with the reference signal in path A at line 14. The signals in the two paths are not of the same strength or amplitude.

The purpose of adjustable attenuator 15 is to match the amplitude of the two input signals at mixer 19. This amplitude matching is accomplished by generating an amplitude error signal in the attenuator path or loop D where the amplitude of the signal in path A is controlled to track the amplitude of the signal in path B.

The signal on line 36 is the same as the signal on line 34 and is applied to power splitter 43 to produce the same signal on lines 44 and 45. The attenuated reference signal on line 53 is the same as the signal on line 18.

The attenuated reference signal in path A may be represented by $K_1$ cosine $[\omega_c t+\omega_c\Delta]$ on line 53. The replica signal in path B may be represented by $K_2$ cosine $[\omega_c t+\omega_{VCO}\tau]$ on line 44. The signals on lines 53 and 44 are applied to the summing element 46 to produce an amplitude difference signal denoted as $K_1$-$K_2$ cosine $[\omega_c t+\omega_c\Delta]$. The output signal on line 47 can be positive or negative depending on the magnitude of the amplitude components $K_1$ and $K_2$.

The amplitude difference signal on line 47 is applied to one input of mixer 48 and the replica signal on line 44 is applied to the other input of mixer 48 to produce an amplitude error signal on line 49 which is filtered by a low pass filter 51 which serves as a smoothing element. The D.C. analog signal on line 52 is applied as a control signal input to adjustable attenuator 15 to cause the amplitude of the reference signal in path A on line 53 to match or track the amplitude of the replica signal in path B on line 44. When the amplitude $K_1$ at line 53 is greater than the amplitude $K_2$ at line 44, a positive signal is produced on line 47 which increases the attenuation of attenuator 15. When the amplitude of $K_2$ is greater than the amplitude of $K_1$, a negative signal is produced on line 47 which decreases the value of the attenuator 15.

It will now be understood that phase tracking loop C adjusts the phase of the signal in path B to match the phase of the signal in path A. Amplitude tracking loop D adjusts the magnitude of the attenuator 15 to increase or decrease the amplitude of the signal in path A at lines 18 and 53 to match or equal the amplitude of the replica signal in path B at lines 34 and 44.

Having explained a generic and preferred embodiment of the present invention adaptive processor, it will be understood that strong undesired signals present in paths A and B may be automatically cancelled. When desired signals are also present in either or both paths A and B, these undesired signals may be cancelled and the desired signals recovered on line 54 by known techniques.

While the preferred embodiment of FIG. 1 has been explained employing a local oscillator 8 to transpose the carrier frequency on line 22 to an intermediate frequency on lines 32 and 34, it will be understood that mixers 13 and 29 and oscillator 8 may be eliminated when not required, and that an appropriate sign change for the input of the VCO signal at mixer 23 should be made.

The preferred embodiment adaptive processor has been explained employing a carrier frequency input. However, the same adaptive processor may be employed to cancel pseudonoise generated signals of the type employed in transmitting-receiving equipment.

I claim:

1. An adaptive processor system of the type employed to eliminate undesired signals, comprising:

a first signal path having an undesirable reference signal thereon, a second signal path having an attenuated and delayed replica of said undesired reference signal thereon, which is processed to track said reference signal, a phase tracking feedback path connected in parallel with said second signal path and adapted to shift the phase of said attenuated and delayed replica of said undesired reference signal in said second path to equal the phase of said reference signal, said phase tracking feedback path comprising therein, a voltage controlled oscillator and a delay coupled to the output of said voltage controlled oscillator, the output of said delay being phase shifted as a function of the frequency of said voltage controlled oscillator to provide a phase shifted oscillator output signal, and means in said second signal path for coupling said oscillator output signal and said phase shifted oscillator output signal to the attenuated and delayed replica of said reference signal to provide a phase shifted attenuated and delayed replica signal in phase with said reference signal.

2. An adapted processor as set forth in claim 1 which further includes adjustable attenuation means in said first signal path for attenuating said reference signal.

3. An adaptive processor as set forth in claim 2 wherein said phase tracking feedback path comprises a first mixer coupled to said attenuated reference signal.

4. An adaptive processor as set forth in claim 3 wherein said second signal path comprises a quadrature power splitter for changing the phase of said phase shifted replica signal by ninety degrees, the ninety degree phase shifted replica signal being subtracted in frequency from said attenuated reference signal in said first mixer of said phase tracking feedback path to provide an error signal output which is coupled to said voltage controlled oscillator to control its frequency output.

5. An adaptive processor as set forth in claim 4 wherein said means for coupling in said second signal path comprises a second mixer having its inputs coupled to the output of said delay and to said attenuated and delayed replica of said reference signal to provide a phase shift and a change in the frequency of said attenuated and delayed replica of said reference signal.

6. An adpative processor as set forth in claim 5 wherein said means for coupling in said second signal path further comprises a third mixer having its inputs coupled to the output of said second mixer and to the output of said voltage controlled oscillator to provide a phase shifted attenuated and delayed replica signal in phase with said reference signal.

7. An adaptive processor as set forth in claim 2 which further includes, a summing element having its inputs connected to said attenuated reference signal and to said phase shifted attenuated and delayed replica signal for providing an in phase output signal indicative of the amplitude difference of the two input signals.

8. An adaptive processor as set forth in claim 7 wherein said in phase output signal is generated as a positive and/or negative control signal.

9. An adaptive processor as set forth in claim 7 which further includes a fourth mixer having its inputs coupled to the in phase output signal and said phase shifted attenuated and delayed replica signal to provide an output analogue signal proportional to the amplitude difference of said input signals.

10. An adaptive processor as set forth in claim 9 wherein the output of said fourth mixer is coupled to said adjustable attenuation means to provide adjustment of the amplitude of said attenuated reference signal, wherein said attenuated reference signal tracks the amplitude of said phase shifted attenuated and delayed replica signal.

11. An adaptive processor as set forth in claim 10 which further includes a smoothing element intermediate said fourth mixer and said adjustable attenuation means to provide a control signal input to said adjustable attenuation means.

12. An adaptive processor as set forth in claim 11 wherein said smoothing element comprises a low pass filter.

13. An adaptive processor as set forth in claim 7 which further includes an attenuated desired signal in said first and second signal path, and wherein said attenuated desired signal appears as an output signal at the output of said summing element.

* * * * *